US011700348B2

(12) United States Patent
Mine et al.

(10) Patent No.: US 11,700,348 B2
(45) Date of Patent: *Jul. 11, 2023

(54) SYSTEMS AND METHODS FOR TRACKING OBJECTS IN A FIELD OF VIEW

(71) Applicant: DISNEY ENTERPRISES, INC., Burbank, CA (US)

(72) Inventors: Mark R. Mine, Burbank, CA (US); Steven M. Chapman, Thousand Oaks, CA (US); Alexa L. Hale, Burbank, CA (US); Joseph M. Popp, Cerritos, CA (US); Dawn J. Binder, Burbank, CA (US); Calis O. Agyemang, Burbank, CA (US); Alice Taylor, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/463,970

(22) Filed: Sep. 1, 2021

(65) Prior Publication Data
US 2021/0400174 A1 Dec. 23, 2021

Related U.S. Application Data

(63) Continuation of application No. 16/296,155, filed on Mar. 7, 2019, now Pat. No. 11,128,783.
(Continued)

(51) Int. Cl.
*H04N 5/20* (2006.01)
*H04N 5/222* (2006.01)
(Continued)

(52) U.S. Cl.
CPC ........... *H04N 5/2228* (2013.01); *G06F 3/011* (2013.01); *G06T 7/73* (2017.01); *G06T 7/90* (2017.01);
(Continued)

(58) Field of Classification Search
CPC .... H04N 5/2228; H04N 5/2224; G06F 3/011; G06F 3/0346; G06T 7/73; G06T 7/90;
(Continued)

(56) References Cited

U.S. PATENT DOCUMENTS

| 1,097,932 A * | 5/1914 | Overmyer ............... C03B 15/14 65/173 |
| 2011/0081048 A1* | 4/2011 | Woo .......................... G06T 7/12 382/103 |

(Continued)

OTHER PUBLICATIONS

Fortin et al., "Handling Occlusions in Real-time Augmented Reality : Dealing with Movable Real and Virtual Objects", Proceedings of the 3rd Canadian Conference on Computerand Robot Vision (CRV'06) (Year: 2006).*

(Continued)

*Primary Examiner* — Qian Yang
(74) *Attorney, Agent, or Firm* — Dorsey & Whitney LLP

(57) ABSTRACT

Systems and methods for tracking objects in a field of view are disclosed. In one embodiment a method may include capturing, via a camera, a real-world object in the field of view; generating a first object data associating the real-world object with a first position of the real-world object in a real-world environment at a first time; generating a virtual object representative of the real-world object depicting the real-world object in the first position at the first time; generating a second object data associating the real-world object with a second position of the real-world object in the real-world environment at a second time, determining a displacement value of the real-world object between the first position and the second position, modifying the virtual object to include an indication that the real-world object has been displaced when the displacement value is greater than a threshold value.

20 Claims, 7 Drawing Sheets
(3 of 7 Drawing Sheet(s) Filed in Color)

Related U.S. Application Data

(60) Provisional application No. 62/639,925, filed on Mar. 7, 2018.

(51) Int. Cl.
*G06F 3/01* (2006.01)
*G06T 11/60* (2006.01)
*G06T 7/73* (2017.01)
*G06T 7/90* (2017.01)
*G06V 20/20* (2022.01)
*G06V 20/64* (2022.01)

(52) U.S. Cl.
CPC .............. *G06T 11/60* (2013.01); *G06V 20/20* (2022.01); *G06V 20/64* (2022.01)

(58) Field of Classification Search
CPC ................... G06T 11/60; G06T 7/246; G06T 2207/10016; G06T 2207/10024; G06V 20/20; G06V 20/64
See application file for complete search history.

(56) References Cited

U.S. PATENT DOCUMENTS

| | | | |
|---|---|---|---|
| 2016/0044298 A1* | 2/2016 | Holz | H04N 13/296 348/47 |
| 2016/0133057 A1 | 5/2016 | Kaino et al. | |
| 2017/0053437 A1 | 2/2017 | Ye et al. | |
| 2017/0124770 A1 | 5/2017 | Vats | |
| 2017/0243403 A1* | 8/2017 | Daniels | G06T 19/20 |
| 2018/0173404 A1 | 6/2018 | Smith | |
| 2018/0268611 A1* | 9/2018 | Nourai | G06T 19/006 |
| 2018/0299952 A1* | 10/2018 | Koker | G06F 3/011 |
| 2019/0235636 A1 | 8/2019 | Marcolina et al. | |
| 2019/0266798 A1* | 8/2019 | Ngai | G06F 1/163 |

OTHER PUBLICATIONS

Dimitrov, Kanio et al., "Towards a World of Totally Identified Objects", IEEE, 2009, pp. 83-88.

Tsai, Tiffany, "Augmented reality is conquering new frontiers with Star Wars", Mar. 3, 2016, 2 pages.

* cited by examiner

SYSTEMS AND METHODS FOR TRACKING OBJECTS IN A FIELD OF VIEW

CROSS-REFERENCE TO RELATED APPLICATIONS

The present application is a continuation of U.S. patent application Ser. No. 16/296,155 filed Mar. 7, 2019, entitled "Systems and Methods for Tracking Objects in a Field of View", which claims priority to U.S. Provisional Patent Application No. 62/639,925, filed Mar. 7, 2018, entitled "Augmented Reality and Virtual Reality Systems", the contents of which are incorporated herein by reference in their entirety.

TECHNICAL FIELD

The present disclosure relates generally to augmented reality presentations.

BRIEF SUMMARY OF THE DISCLOSURE

Embodiments of the disclosure are directed to systems and methods for tracking objects in a field of view.

A method for tracking objects in a field of view is disclosed. In one embodiment, the method includes capturing, via a camera, a real-world object in the field of view; generating a first object data associating the real-world object with a first position of the real-world object in a real-world environment at a first time; generating a virtual object representative of the real-world object depicting the real-world object in the first position at the first time; generating a second object data associating the real-world object with a second position of the real-world object in the real-world environment at a second time, determining a displacement value of the real-world object between the first position and the second position, modifying the virtual object to include an indication that the real-world object has been displaced when the displacement value is greater than a threshold value.

Optionally, in some embodiments, the method includes rendering the virtual object in an augmented reality environment; and displaying the virtual object on a display of an augmented reality device.

Optionally, in some embodiments, the augmented reality environment includes a composite scene including the virtual object in the first position, and the real-world object in the second position; and the method further includes displaying, via the display, the composite scene.

Optionally, in some embodiments, the method includes storing, in a non-transient storage medium, the first object data.

Optionally, in some embodiments, the method includes determining the displacement value of the real-world object comprises retrieving the first object data from the non-transient storage medium and comparing the first object data and the second object data.

Optionally, in some embodiments, at least one of the first object data or the second object data includes an orientation and a position of the real-world object as a function of time.

Optionally, in some embodiments, the indication includes rendering the virtual object with a first color at the first time and rendering the virtual object with a second color different than the first color at the second time responsive to the displacement value being greater than the threshold value.

Optionally, in some embodiments, generating the composite scene includes overlaying the virtual object including the second color with the real-world object in the second position.

Optionally, in some embodiments, at least one of the first object data or the second object data is configured to specify a location of the real-world object in a plot of content.

Optionally, in some embodiments, at least one of the first object data or the second object data is configured to specify a first character in a plot of content.

Optionally, in some embodiments, the real-world object comprises one or more of a second camera, a camera accessory, a person, or a prop.

Optionally, in some embodiments, at least one of the first object data or the second object data includes an indication of a level of secrecy associated with the real-world object.

Optionally, in some embodiments, the method includes comparing the field of view against a baseline to generate a comparison configured for use in determining a presence of a foreign real-world object that does not belong in content; generating a foreign object data based on the comparison; generating a foreign virtual object based on the foreign object data, the foreign virtual object being configured to depict the foreign object data; and displaying the foreign virtual object on a display of an augmented reality device.

Optionally, in some embodiments, at least one of the first object data comprises a timecode configured to identify the first position of the real-world object as a function of time.

Optionally, in some embodiments, at least one of the first object data or the second object data comprises an identifier configured to identify the real-world object.

Optionally, in some embodiments, the first object data comprises a three-dimensional volume of the real-world object and the virtual object is generated to have a three-dimensional volume that matches the three-dimensional volume of the real-world object.

Optionally, in some embodiments, the threshold value is based on a three-dimensional volume of the real-world object.

A system for tracking objects in a field of view is disclosed. In one embodiment, the system includes one or more processing elements; one or more computer-readable non-transitory storage media encoded with instructions that when executed cause the one or more processing elements to perform operations including: capturing a real-world object in the field of view; generating a first object data associating the real-world object with a first position of the real-world object in a real-world environment at a first time; generating a virtual object representative of the real-world object to depict the real-world object in the first position at the first time; generating second object data associating the real-world object with a second position of the real-world object in the real-world environment at a second time, determining a displacement value of the real-world object between the first position and the second position, modifying the virtual object to include an indication that the real-world object has been displaced when the displacement value is greater than a threshold value.

Optionally, in some embodiments, the operations further include: rendering the virtual object in an augmented reality environment; and displaying the virtual object on a display of an augmented reality device.

Optionally, in some embodiments, the operations further include: rendering a composite scene including the virtual object in the first position, and the real-world object in the second position; and displaying, via the display, the composite scene.

Other features and aspects of the disclosed technology will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The patent or application file contains at least one drawing executed in color. Copies of this patent or patent application publication with color drawings will be provided by the Office upon request and payment of the necessary fee.

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

In accordance with various embodiments, an augmented (AR) experience can be presented to a user through which positions of one or more objects in a field of view as a function of time may be tracked and/or controlled by an AR device and/or a capture device. One or more virtual objects may be generated by identifying the one or more objects in a location at a given time. By leveraging AR technologies, the user can track, e.g., visualize, and/or control, e.g., manipulate, a position of a given object in a field of view. This may be useful to help film scenes to ensure that a given object is in the proper position, which can include the same position at the end of one take and at the beginning of another take of the same scene and a specific position for a scene involving an object. A field of view may refer to a view(s) of the real-world environment in which the AR device is directed toward at a given moment in time. For instance, a field of view may be a series of images of a real-world environment. In some embodiments, a field of view may include one or more virtual objects.

As used herein, an AR device refers to any device capable of displaying a real-time view of a physical, real-world environment while altering elements within the displayed view of the environment. As such, an AR device displays a view of the real world but augments (e.g., adds or modifies) elements using computer graphics technology. Such an AR device may include and/or be communicatively coupled to a capture device (or multiple capture devices) used to capture a view of the real-world environment and may further include computer software and/or hardware configured to augment elements of the captured scene. When a user looks through or at the AR device, the user sees an augmented view of the physical real-world environment in which the user is located.

Figure 1:
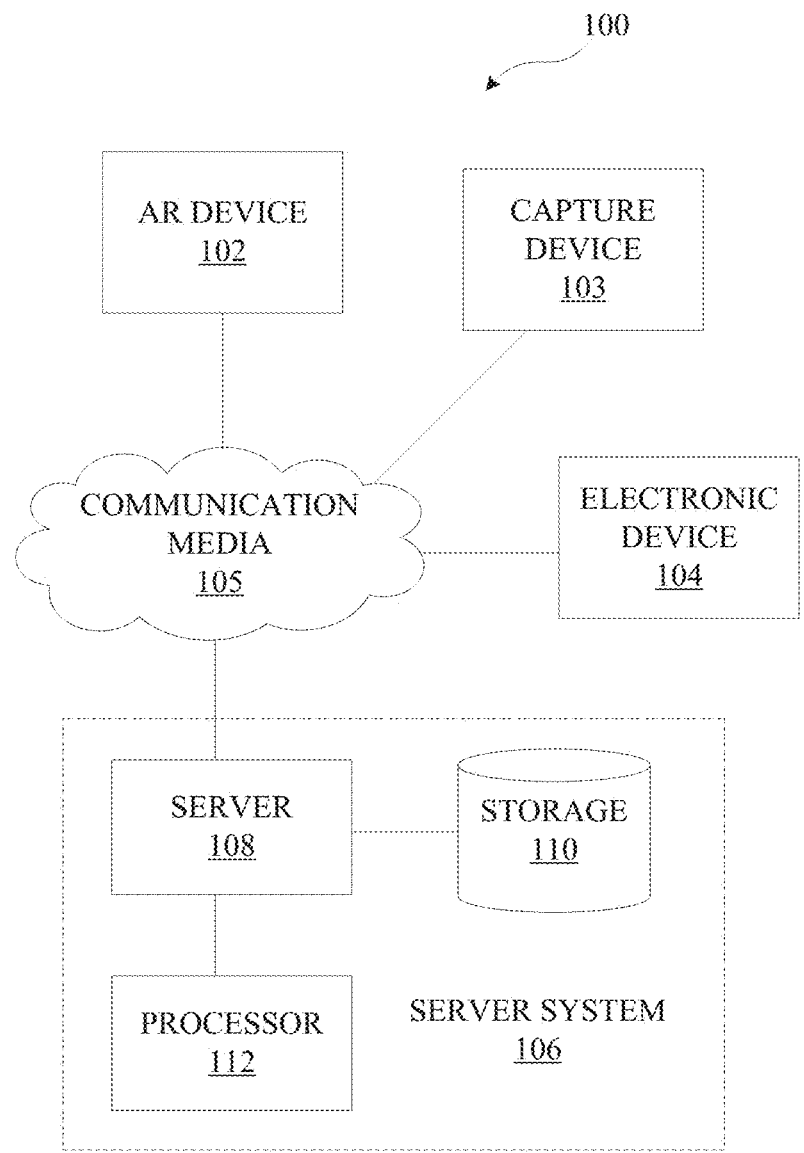
FIG. 1 illustrates an example augmented reality (AR) system in accordance with various embodiments of the present disclosure.

FIG. 1 depicts example environment 100, which may be used in connection with implementing embodiments of the disclosed systems, methods, and devices. By way of example, the various below-described components of FIG. 1 may be used to track and/or control one or more objects and/or one or more virtual objects in a field of view. The field of view may be captured by AR device 102 and/or capture device 103. The field of view may include one or more objects. The one or more objects may include capture devices (e.g., cameras, microphones, etc.), capture device accessories (e.g., dollies, tracks, cranes, tripods, crane, etc.), people, movie props (e.g., swords, houses, fences, cups, etc.), and/or other objects. The one or more objects may be identified by object recognition software of the captured content, markers, depth recording techniques, sensors, the one or more capture devices, and/or a database.

Figure 2:
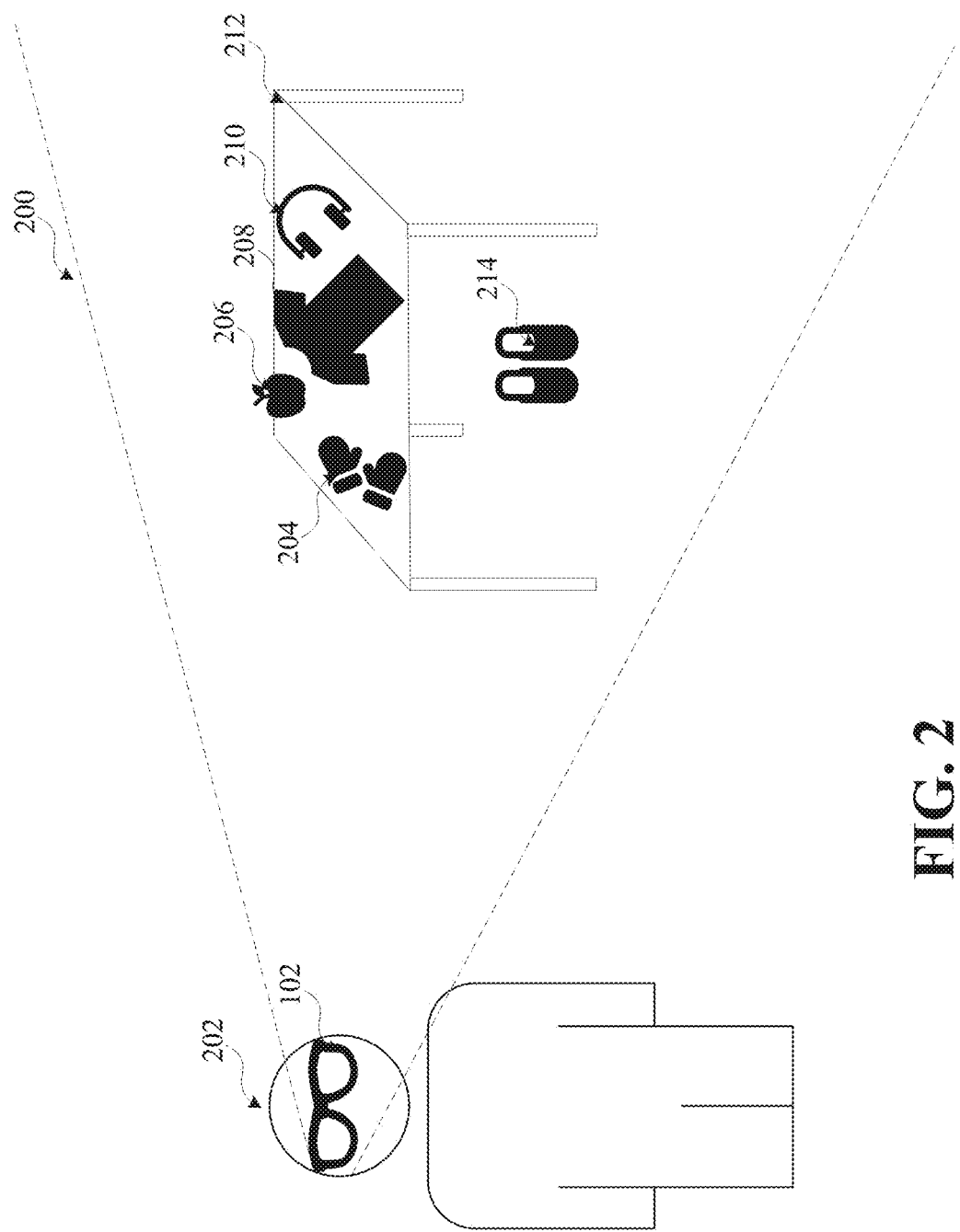
FIG. 2 illustrates an example field of view with one or more objects, in accordance with various embodiments of the present disclosure.

For example, referring to FIG. 2, an example field of view 200 is illustrated with one or more objects. Field of view 200 in the field of view of user 202 includes object 204, object 206, object 208, object 210, object 212, and object 214. Object 204, object 206, object 208, object 210, object 212, and object 214 may be real-world objects. While no capture device is illustrated, it should be appreciated that portable and/or fixed capture devices may be used to capture the one or more objects and/or generate object data.

Referring back to FIG. 1, AR device 102 and/or capture device 103 may send object data to server system 106. In embodiments, the object data may be retrieved from storage 110. Object data may be used to generate one or more virtual objects that correspond to the one or more objects and positions of the one or more objects at a first time, which, in some embodiments, may be a selected time. The one or more virtual objects may be displayed on AR device 102. The one or more virtual objects may be generated from capture devices capturing an object at a previous time. In some embodiments, the one or more virtual objects generated from capture devices capturing an object at a previous time may be used as a template to generate and/or place a virtual object in different locations for scenes that will be filmed in the future. The one or more virtual objects may be retrieved based on an identifier and moved to multiple, different locations.

Object data may include positions of the one or more objects as a function of time. In some embodiments, object data may capture the entire three-dimensional volume occupied by real-world objects. Positions may include orientations of the one or more objects in the field of view. AR device 102 and/or capture device 103 may send information that may indicate how AR device 102 and/or capture device 103 is positioned, as well as oriented, in the field of view such that the position of the one or more objects is preserved, regardless of future positions and/or perspectives of the user. For example, a compass with N facing the user in a first position at a first time will always have N facing the first position if retrieved and/or obtained, even if the user is in a second position that may correspond to S on the compass.

The object data may be tracked, recorded, stored, retrieved, and/or obtained. Object data may include timecodes and/or metadata. Object data may be retrieved based on a timecode and/or metadata. For example, individual objects at a given time may be captured and/or tracked using an identifier from the metadata. A first timecode may be used to generate a virtual object corresponding to an object in the corresponding position at the first timecode. The virtual object may be displayed on AR device 102, overlaid onto the field of view based on the field of view of the user.

In embodiments, a first virtual object in a first location corresponding to a first time may be a first color when the first virtual object does not match the first object at a current time and/or a second color when the first virtual object matches the first object at a current time. It should be appreciated that the first time may be a previously recorded version of the object, a version of the object that is generated based on an expected location of the object, and/or a version of the object that is generated to identify where the object does not belong. Server system 106 may determine whether the first virtual object matches a position of the object at a current time based on a threshold value. The threshold value may be a millimeter, an inch, a foot, etc. For example, using a millimeter threshold value, if a first virtual object at a first time is more than one millimeter away from the first object at a current time, the first virtual object at the first time may be a first color. The threshold value may be based on the size of the object. For example, a threshold value for a car may be inches or feet, while a coffee cup may have a threshold value on a millimeter scale. This feature may be used to help identify mispositioned items in a field of view to maintain continuity in content (e.g., movie, show, etc.). In embodiments, subparts of the one or more objects may also be tracked and there may be object data generated, stored, retrieved, and/or obtained about the subparts of the one or more objects. For example, a person may be wearing clothes that have adjusted, hair that may be out of place, a ring on the wrong finger, a phone screen being off when it was on earlier, etc. Changes to positions of subparts of the one or more object may cause changes to indicate virtual objects do not match the current object. In some embodiments, the one or more virtual objects may be displayed to an actor to help engage with green screen objects more realistically.

In some embodiments, AR device 102 and/or capture device 103 may capture one or more foreign objects. The one or more foreign objects may include the same type of objects as the one or more objects. The one or more captured foreign objects may be used to generate foreign object data. The foreign object data may be used to dynamically generate one or more virtual foreign objects. Displaying the virtual foreign objects may include applying a color/symbol to the one or more foreign objects (e.g., dark red, bright white, an "X" over the object, etc.). It should be appreciated that a baseline field of view including the one or more objects may be generated before foreign object data is generated. This may help identify which objects are foreign by comparing against a baseline. The baseline may be updated as appropriate by the user. This feature may be used to help identify objects in a field of view that do not belong on the set and/or in the content.

Figure 3:
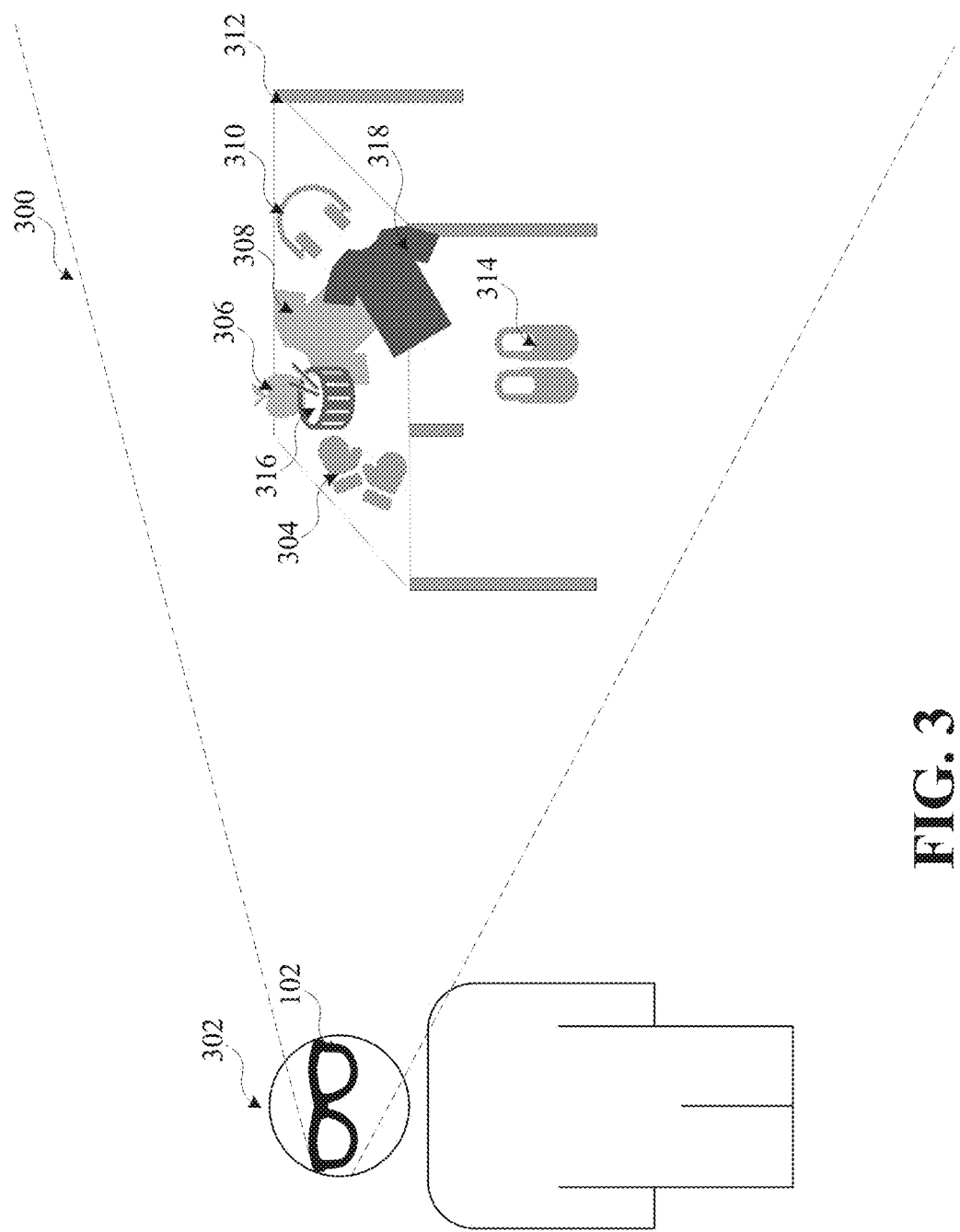
FIG. 3 illustrates an example field of view with one or more objects at a current time compared to one or more virtual objects at a first time, in accordance with various embodiments of the present disclosure

FIG. 3 illustrates example field of view 300 with one or more objects at a current time compared to one or more virtual objects at a first time, in accordance with various embodiments of the present disclosure. As illustrated, the first time may correspond to field of view 200 in FIG. 2. It should be appreciated that the first time may correspond to a time preceding the current time or may correspond to a future time. For example, the field of view 200 in FIG. 2 may be created by a director wanting to set up how a scene will look using one or more virtual objects. Virtual objects 304, 310, 312, and 314 corresponding to a first time may match the position of the one or more objects at the current time. Virtual objects 304, 310, 312, and 314 may be green to indicate positions at the first time match the position of the objects at the current time.

As illustrated, virtual object 312, the table, may be outlined in green to better illustrate that virtual object 304 and virtual object 310 match the position of the corresponding objects at a current time. Virtual object 306 may not match the position of the corresponding object at a current time and may be grayed out. Object 316 may be a dark red to indicate the object is a foreign object, as will be discussed herein. Virtual object 308 may be grayed out to indicate the position of the corresponding object at the first time. Object 318 may be red to indicate the current position of the object does not match the position of virtual object 308. The orientation of object 318 also does not match the current orientation of the object. It should be appreciated that either a variation of position or orientation of an object at a current time compared to a position or orientation of a virtual object at a first time may cause a color to be applied to the object at a current time and/or the virtual object at the first time. In some embodiments, the entire field of view may be highlighted a color when the one or more virtual objects at the selected time do not match the one or more objects at a current time and another color when the one or more virtual objects at the selected time match the one or more objects at a current time.

In embodiments, the object data may include metadata. Metadata may include an identifier to uniquely identify an individual object in a given location at a given time (e.g., a timecode, a name corresponding to the object in the given location at the given time, etc.), an amount of space the object takes up (e.g., a total volume, the boundaries of the object, etc.), whether the object may be augmented post-editing (e.g., whether visual effects may be applied in the movie that may augment or otherwise affect how the object looks in a final cut), how the object is augmented post-editing (e.g., the visual effects that may be applied to the virtual object), what scenes the object is expected to be used in (e.g., when and where the object may need to be in expected future scenes, when an object can be stored because it is no longer needed for a movie), a level of secrecy or privacy associated with the object (e.g., suggestive scenes being shot may require the highest privacy/secrecy level for the actor, some scenes may reveal sensitive plot points and spoilers and have a lower secrecy level, etc.).

In one example, a car may be parked in a first location at a first time. The metadata may include an identifier for the car parked in the first location at the first time, how much space the car parked in the first location at the first time takes up, whether the car parked in the first location at the first time will include visual effects post-editing, whether the car parked, generally, will include visual effects post-editing, how the car parked in the first location at the first time will be augmented (if it will have visual effects), how the car, generally, will be augmented, what scenes the car, generally, will be used in, whether augmented or not, and a level of secrecy associated with the car and corresponding scenes associated with a level of secrecy. The secrecy or privacy feature may alert security with AR device 102 to be on high alert to prevent entrance to the set for a period of time. The secrecy feature may include a timer that corresponds to when the scene is done filming, when the movie is in theaters, etc.

Metadata may correspond to a parameter of an object (e.g., a location in the plot of the content, such as a character's room, an outside environment, etc., and/or a character in the plot of the content). In some embodiments, the metadata may affect how the virtual objects are displayed. For example, virtual objects corresponding to a first parameter may be a first color, and the virtual objects corresponding to a second parameter may be a second color. It should be appreciated that different colors may be used, and that more than two parameters may be used (e.g., a third parameter with virtual objects of a third color, a fourth parameter with virtual objects of a fourth color, etc.). This feature may help ensure no items are misplaced in wrong locations or to help identify which items belong to which character.

Figure 4:
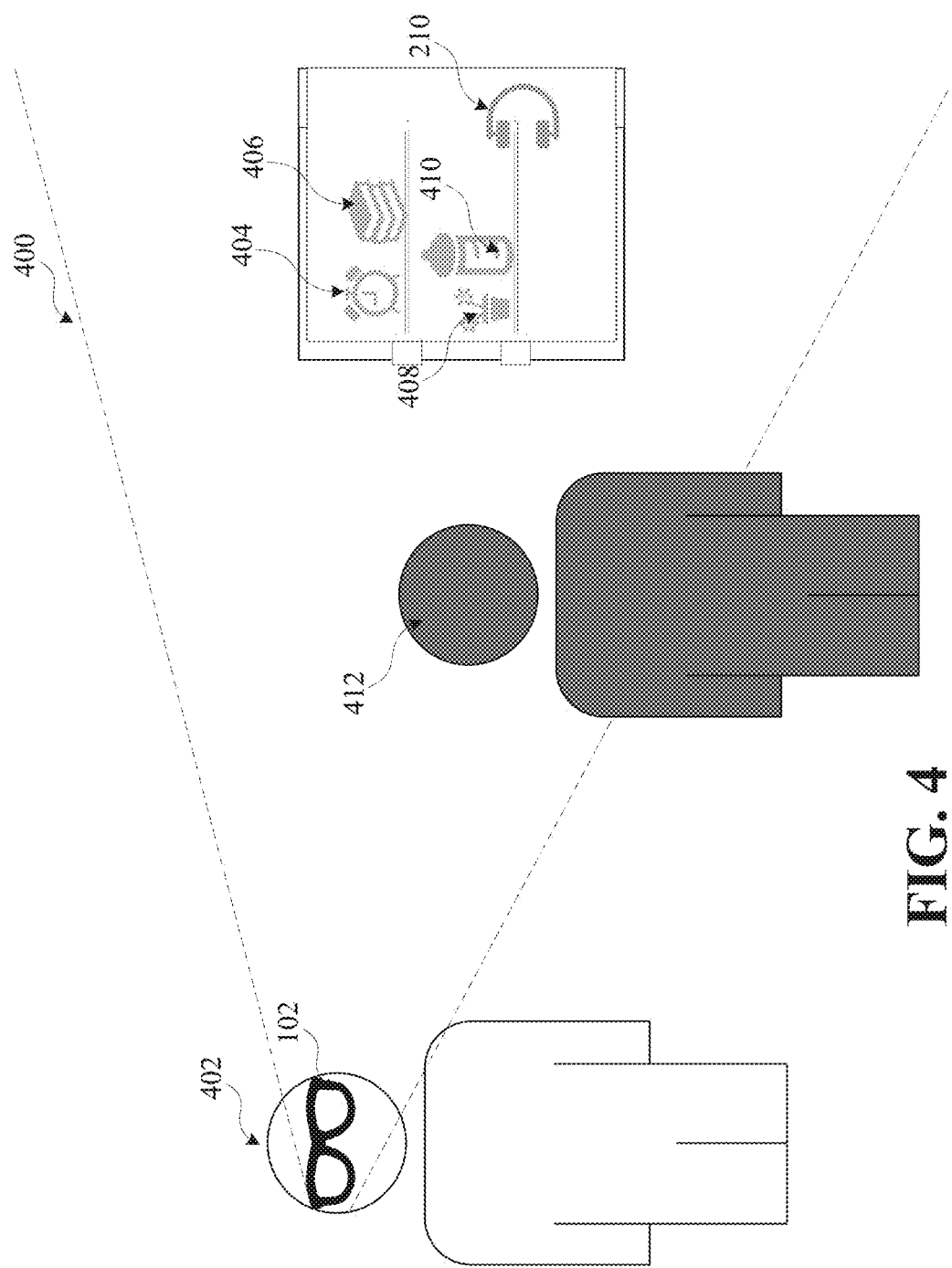
FIG. 4 illustrates an example field of view with one or more objects, in accordance with various embodiments of the present disclosure

FIG. 4 illustrates example field of view 400 with one or more objects, in accordance with various embodiments of the present disclosure. As illustrated, field of view 400 in the field of view of user 402 includes virtual object 404, virtual object 406, virtual object 408, virtual object 410, virtual object 210 (FIGS. 2 and 3), and virtual object 412. Objects 404, 406, 408, and 410 may be gold because they correspond to a current location in the plot of the content. The location may be limited to a bookshelf in a room, the room itself, the building with the room, the city with the building, etc. Object 210 may be green because it corresponds to a second location in the plot of the content, the location of FIGS. 2 and 3. Object 412 may be dark red to indicate it does not belong in the field of view, as described above. It should be appreciated that objects 404, 406, 408, and 410 may be gold because they correspond to a first character in the content and object 210 may be green because it corresponds to a second character in the content. The content may be a movie, a tv show, etc.

Referring back to FIG. 1, AR device 102 and/or capture device 103 may generate and/or communicate location information, camera information (e.g., intrinsic camera information and extrinsic camera information), and/or other information.

In embodiments, location information may include the real-world location of AR device 102 and/or capture device 103. The location information may be determined using GPS, Bluetooth, RFID, a cellular receiver, a network interface card, an altimeter, and/or other technology. The location information may be processed by processor 112 to determine the geographical coordinates of AR device 102. For example, application software installed in storage 110 may use the location of AR device 102 from a GPS reading (e.g., stored or retrieved from a network) to determine the geographical coordinates of AR device 102. The location information may be used in generating one or more virtual objects.

In embodiments, camera information may include the angle that the camera is facing, the direction the camera is facing, the camera orientation, the shutter speed, the field of view, the f stop, the film speed, the focal length, aperture, etc. Location information and camera information may be used to determine whether a virtual object is in the field of view of the user at a first time and/or in generating the virtual object.

In embodiments, the one or more virtual objects correspond to the one or more objects in the field of view at a first time. The one or more virtual objects may be generated based on the location information and/or camera information of AR device 102 and/or capture device 103, as well as object data. The one or more virtual objects may be displayed on a display of AR device 102. The field of view may dynamically change based on the movement of AR device 102.

In embodiments, the one or more virtual objects and the video may be rendered through a graphics engine. One of skill in the art will appreciate different technologies may be used to render and/or generate the one or more virtual objects. The one or more virtual objects may be overlaid on the display of AR device 102.

In embodiments, the real-time, real-world video and the one or more virtual objects may be displayed as a video on a display device, such as a monitor, TV, and/or VR system. As used herein, the term "virtual reality" or "VR" generally refers to a simulation of a user's presence in an environment, real or imagined, such that the user may interact with it. Server system 106 generating the real-world video and virtual objects may use the location information, the camera information, and the object data to determine whether the one or more virtual objects are within a given field of view. The location information and camera information from AR device 102 may be used to determine what region AR device 102 is capturing.

As shown in FIG. 1, environment 100 may include one or more of AR device 102, capture device 103, electronic device 104, and server system 106. AR device 102 can be coupled to capture device 103, electronic device 104, and/or server system 106 via communication media 105. As will be described in detail herein, AR device 102, capture device 103, electronic device 104, and/or server system 106 may exchange communications signals, including object data, foreign object data, one or more timecodes, metadata, location information, camera information, one or more virtual objects, video, content, and/or other information via communication media 105.

AR device 102 may include, for example, a head-mounted display, a see-through display, an optical see-through display, a video see-through display, a visor, glasses, etc. or as part of another user device, such as a laptop PC. AR device 102 may include an AR component, one or more capture devices, a display, one or more sensors, such as an accelerometer, a communications unit, and/or a memory unit. The AR component may use an accelerometer to determine when the position of AR device 102 is changing, for example, which could indicate that the position of AR device 102 relative to the one or more objects is changing. Generally, the accelerometer is a device capable of measuring the physical acceleration of AR device 102. The display of AR device 102 may include a graphical user interface. It should be appreciated that the content being captured and the virtual objects may be composited for a VR display and/or standard display.

In embodiments, the AR component may on its own, or with assistance from the accelerometer, determine the positioning of the one or more objects relative to AR device 102. Object data as a function of time may be generated using the AR component. The AR component may be configured to identify or otherwise recognize markers on the one or more objects as a function of time. For example, the markers may be an embedded watermark, a quick response (QR) code that specifies the object and the position of the object, and/or other markers. It should be appreciated that any type of marker capable of identifying the one or more objects and the object data may be used. The AR component could detect the marker using one or more capture devices and the corresponding object and object data as a function of time.

In one embodiment, the embedded marker may be impossible or difficult to detect using the human eye. For example, the embedded marker could be expressed using an infrared-absorbing material that is invisible or nearly invisible to the human eye.

The AR component may be able to implement the secrecy features, as described above, and generate virtual objects according to the metadata, as described above. The AR component may be configured to allow a user to manipulate the one or more virtual objects. For example, a director may use AR device 102 to place a virtual car in a first location where the virtual car will explode. However, after planning the shot more, the director may realize that the virtual car needs to be moved over 50 feet or so. The director can re-place the virtual car 50 feet away from the first location. When the scene is ready to be filmed, someone may drive the real-world car into the location designated by the director using AR device 102. When the real-world car is in the correct spot, the virtual object may turn green, as described above.

Capture device 103 may include a camera, a microphone, webcam, etc. Capture device 103 may capture the field of view, which may then be displayed to a user through AR device 102, which as described above, may be a see-through display.

Electronic device 104 may include a variety of electronic computing devices, such as, for example, a smartphone, tablet, laptop, computer, wearable device, television, etc. In embodiments, electronic device 104 includes components that may be used to display video, virtual objects, images, and/or other audio/visual information, such as, for example, a television, a monitor, a laptop, a computer, wearable device, tablet, smartphone, etc. In various embodiments, communication media 105 may be based on one or more wireless communication protocols such as Wi-Fi, Bluetooth®, ZigBee, 802.11 protocols, Infrared (IR), Radio Frequency (RF), 2G, 3G, 4G, 5G, etc., and/or wired protocols and media. Communication media 105 may be implemented as a single medium in some cases.

As mentioned, electronic device 104 may take a variety of forms, such as a desktop or laptop computer, a smartphone, a tablet, a smartwatch or other wearable electronic device, a television or other audio or visual entertainment device or system, or the like. AR device 102, capture device 103, and/or electronic device 104 may communicate with other devices and/or with one another over communication media 105 with or without the use of server system 106. In various embodiments, AR device 102, capture device 103, electronic device 104, and/or server system 106 may be used to perform various processes described herein and/or may be used to execute various operations described herein with regards to one or more disclosed systems and methods. It should be appreciated that environment 100 may include multiple AR devices 102, capture devices 103, electronic devices 104, communication media 105, server systems 108, servers 110, processors 114, and/or storage 110.

As mentioned, communication media 105 may be used to connect or communicatively couple AR device 102, capture device 103, electronic device 104, and/or server system 106 to one another or to a network, and communication media 105 may be implemented in a variety of forms. For example, communication media 105 may include an Internet connection, such as a local area network (LAN), a wide area network (WAN), a fiber optic network, internet over power lines, a hard-wired connection (e.g., a bus), and the like, or any other kind of network connection. Communication media 105 may be implemented using any combination of routers, cables, modems, switches, fiber optics, wires, radio (e.g., microwave/RF links), and the like. It should be appreciated that other ways to implement communication media 105 for communications purposes.

Likewise, though not shown, it will be appreciated that a similar communication medium may be used to connect or communicatively couple server 108, storage 110, and/or processor 112 to one another in addition to other elements of environment 100. In example implementations, communication media 105 may be, or include, a wired or wireless wide area network (e.g., cellular, fiber, and/or circuit-switched connection, etc.) for AR device 102, capture device 103, electronic device 104, and/or server system 106, which may be relatively geographically disparate; and in some cases, aspects of communication media 105 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 106 may provide, receive, collect, or monitor information to/from AR device 102, capture device 103, and/or electronic device 104, such as, for example, object data, foreign object data, timecodes, metadata, location information, camera information, virtual objects, video, content, security and encryption information, and the like. Server system 106 may be configured to receive or send such information via communication media 105. This information may be stored in storage 110 and may be processed using processor 112. For example, processor 112 may include an analytics engine capable of performing analytics on information that server system 106 has collected, received, etc. from AR device 102, capture device 103, and/or electronic device 104. Processor 112 may include an AR engine capable of generating and/or displaying virtual objects and/or the video that server system 106 has collected, received, etc. from AR device 102 and/or capture device 103. In embodiments, another engine may be used to generate a video including the one or more virtual objects. In embodiments, server 108, storage 110, and processor 112 may be implemented as a distributed computing network, a relational database, or the like.

Server 108 may include, for example, an Internet server, a router, a desktop or laptop computer, a smartphone, a tablet, a processor, or the like, and may be implemented in various forms, including, for example, an integrated circuit or collection thereof, a printed circuit board or collection thereof, or in a discrete housing/package/rack or multiple of the same. In embodiments, server 108 directs communications among AR device 102, capture device 103, and/or electronic device 104 over communication media 105. For example, server 108 may process and exchange messages among AR device 102, capture device 103, and/or electronic device 104 that relate to object data, foreign object data, timecodes, metadata, location information, camera information, virtual objects, video, content, etc. Server 108 may update information stored on AR device 102, capture device 103, and/or electronic device 104. Server 108 may send/receive information to/from AR device 102, capture device 103, and/or electronic device 104 in real-time or sporadically. Further, server 108 may implement cloud computing capabilities for AR device 102, capture device 103, and/or electronic device 104.

Figure 5:
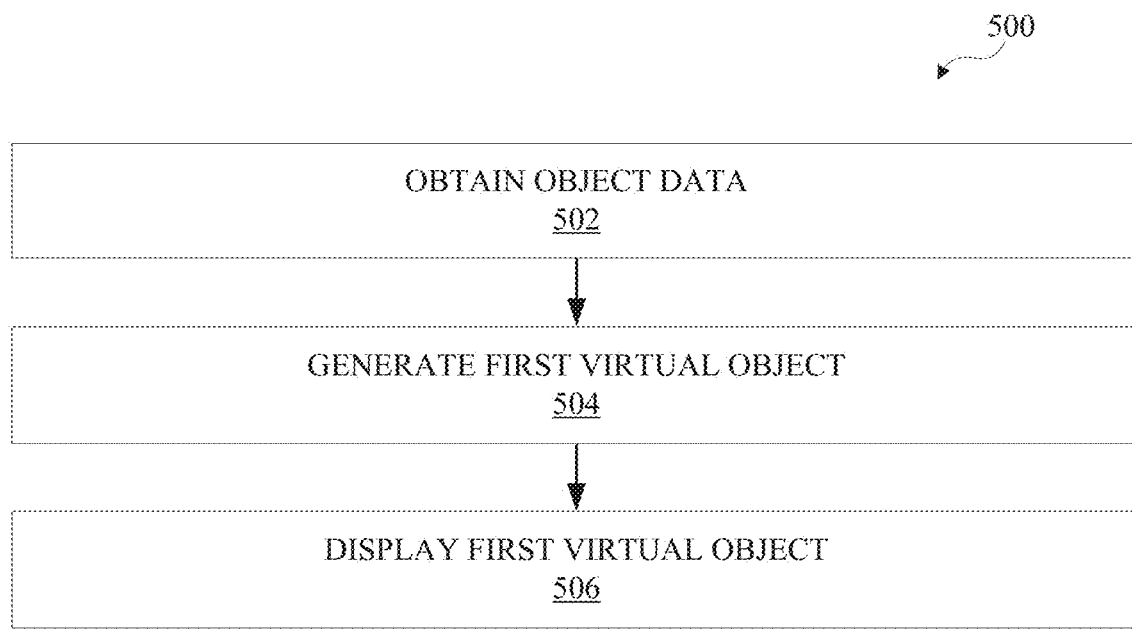
FIG. 5 is an operational flow diagram illustrating an example process for tracking one or more objects in a field of view in accordance with various embodiments.

FIG. 5 is an operational flow diagram illustrating an example process for tracking one or more objects in a field of view in accordance with various embodiments. The operations of the various methods described herein are not necessarily limited to the order described or shown in the figures, and it should be appreciated, upon studying the present disclosure, that variations of the order of the operations described herein are within the spirit and scope of the disclosure.

The operations and sub-operations of the flow diagram may be carried out, in some cases, by one or more of the components, elements, devices, components, and circuitry of system 100. This may include one or more of: server system 106; server 108; processor 112; storage 110; and/or computing component 700, described herein and referenced with respect to at least FIGS. 1 and 7, as well as subcomponents, elements, devices, components, and circuitry depicted therein and/or described with respect thereto. In such instances, the description of the flow diagram may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc. referred to. Thus, it will be appreciated that aspects and features described above in connection with (sub-) components, elements, devices, circuitry, etc., including variations thereof, may be applied to the various operations described in connection with the flow diagram without departing from the scope of the present disclosure.

At 502, object data may be obtained. Object data may include the positions of the one or more objects, as described above. The object data may be generated by capture devices capturing the one or more objects, location information, camera information, etc. In embodiments, object data may be generated dynamically in real-time. In some embodiments, object data may be generated by capturing one or more objects in the field of view as a function of time (e.g., tracking and/or recording the corresponding timecodes) using one or more capture devices. Using the captured one or more objects and location information and/or camera information, object data may be generated by associating the one or more objects with corresponding positions of the one or more objects. The object data may be stored.

At 504, a first virtual object may be generated to depict at least one or more of the object data of a first object at a first time. It should be appreciated that multiple virtual objects may be generated simultaneously, such that all the objects in a field of view have virtual counterparts. The first time may be selected by a user and/or may be automatically selected from a last take. The first virtual object may include digital representations that are displayed on AR device 102. The first virtual object may include colors, textures, sounds, 3D representations, etc.

In embodiments, the first virtual object may be a first color when the first virtual object does not match a position of the first object at a current time, as described above. In some embodiments, the first virtual object may be a second color when the first virtual object matches a position of the first object at a current time. The first color and the second color may be different colors.

In some embodiments, the object data may include metadata, as described above. Virtual objects corresponding to first metadata may be a third color, virtual objects corresponding to second metadata may be a fourth color, and so on.

In embodiments, foreign object data may be generated and used to generate one or more foreign virtual objects. Foreign object data may be generated by comparing the one or more object in a field of view to a baseline field of view. For example, object 316 in FIG. 3 and object 412 in FIG. 4 may be foreign objects because the baseline field of view does not include these objects. Accordingly, the foreign virtual objects may be a fifth color.

At 506, the first virtual object may be displayed. The first virtual object may be displayed on AR device 102.

Figure 6:
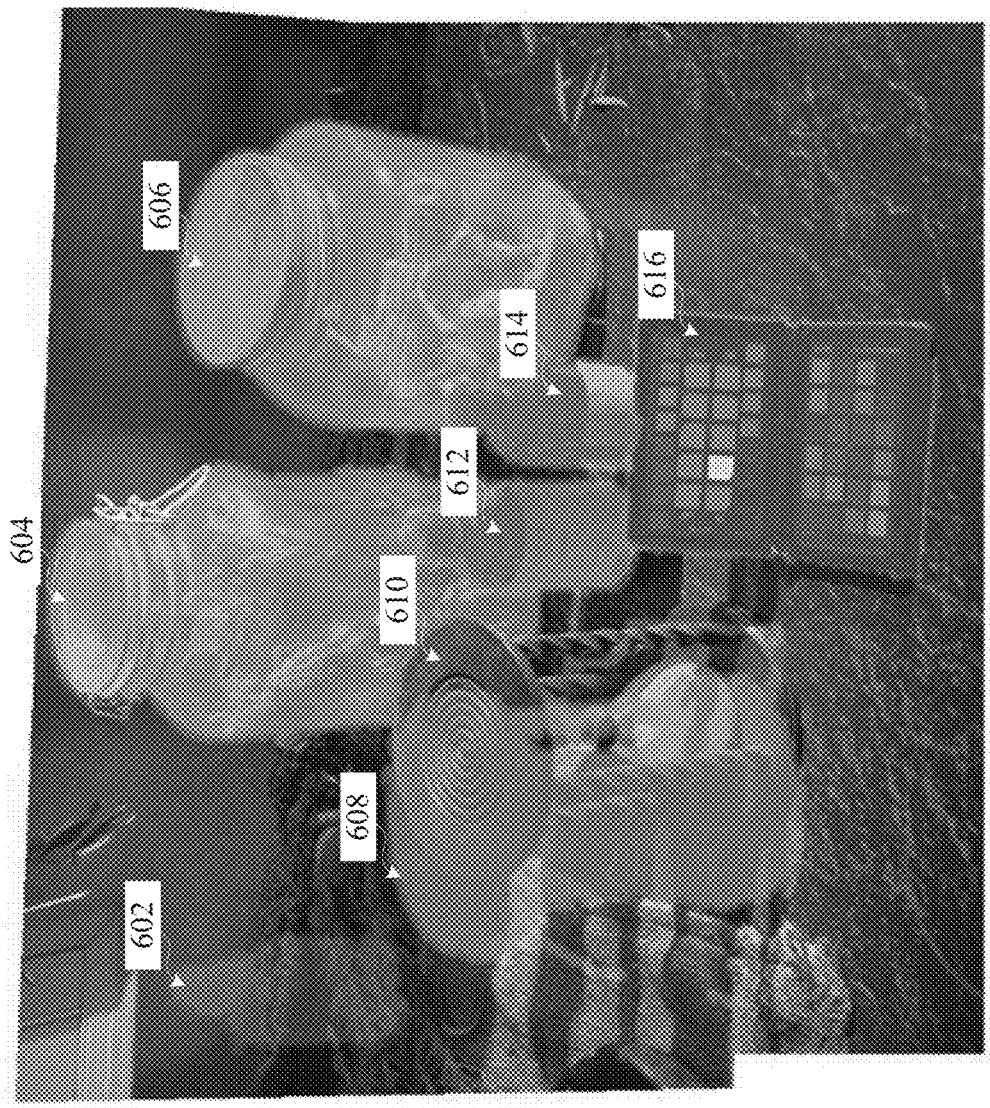
FIG. 6 is an example field of view with one or more objects, in accordance with various embodiments of the present disclosure.

FIG. 6 is an example field of view with one or more objects, in accordance with various embodiments of the present disclosure. Virtual objects, 604, 606, 612, and 614 may represent virtual objects at a selected time in orange because it matches the corresponding objects at a current time. Virtual object 608 may be orange because the difference between virtual object 608 at the selected time and object 610 at the current time are within a threshold range and/or because it would be obvious to adjust object 610 to match the position of virtual object 608. Object 602 may be gold because the object is now missing from the scene. Object 616 may be red because it is a foreign object, as described above.

Figure 7:
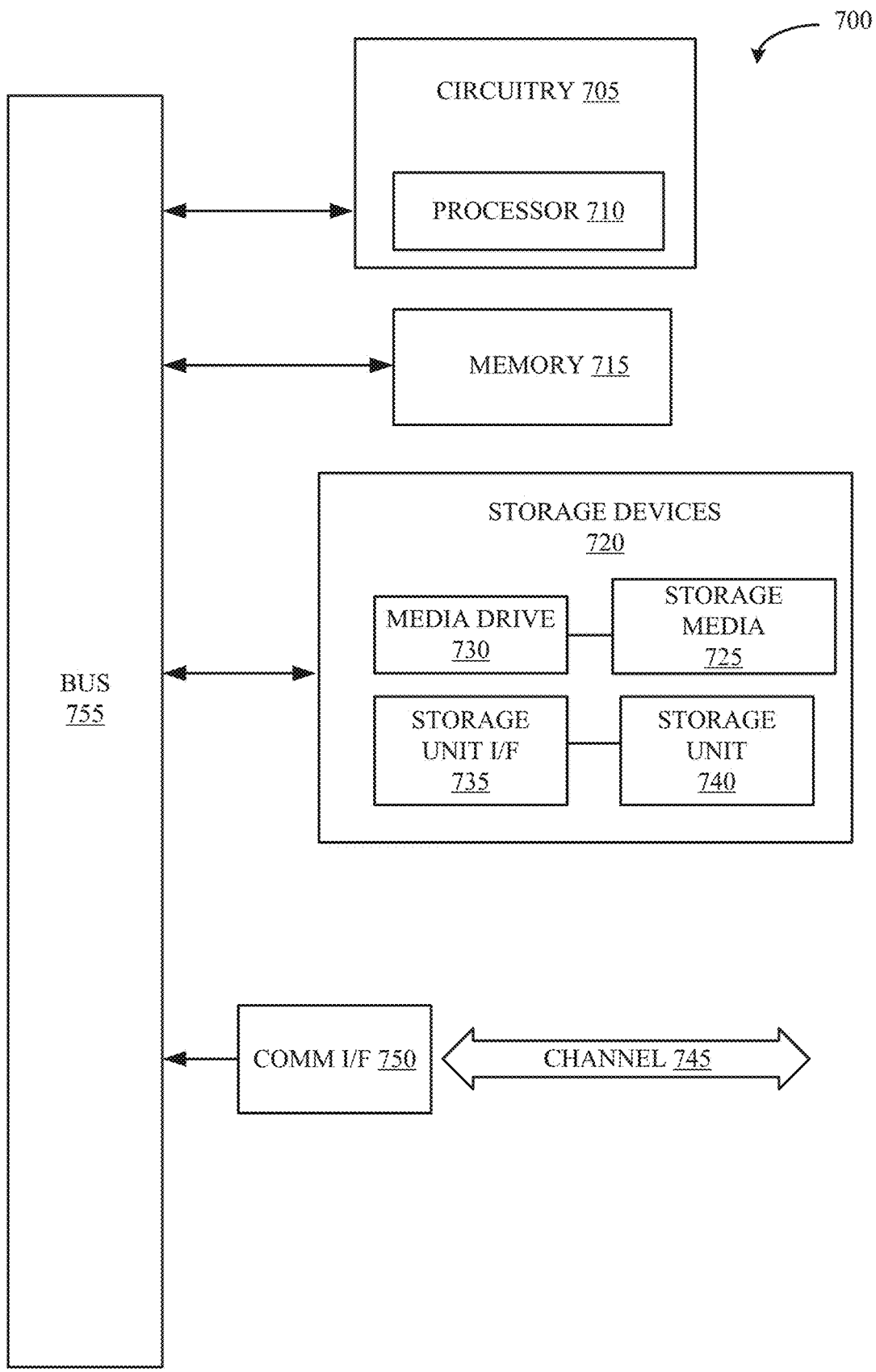
FIG. 7 is an example computing component that may be used to implement various features of embodiments described in the present disclosure.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where engines and/or components of the technology are implemented in whole or in part using software, in one embodiment, these software elements can be implemented to operate with a computing or processing component capable of carrying out the functionality described with respect thereto. One such example computing component is shown in FIG. 7. Various embodiments are described in terms of this example—computing component 700. After reading this description, it will become apparent to a person skilled in the relevant art how to implement the technology using other computing components or architectures.

Referring now to FIG. 7, computing component 700 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 700 is specifically purposed.

Computing component 700 may include, for example, one or more processors, controllers, control components, or other processing devices, such as a processor 710, and such as may be included in circuitry 705. Processor 710 may be implemented using a special-purpose processing engine such as, for example, a microprocessor, controller, or other control logic. In the illustrated example, processor 710 is connected to bus 755 by way of circuitry 705, although any communication medium may be used to facilitate interaction with other components of computing component 700 or to communicate externally.

Computing component 700 may also include one or more memory components, simply referred to herein as main memory 715. For example, random access memory (RAM) or other dynamic memory may be used for storing information and instructions to be executed by processor 710 or circuitry 705. Main memory 715 may also be used for storing temporary variables or other intermediate information during execution of instructions to be executed by processor 710 or circuitry 705. Computing component 700 may likewise include a read only memory (ROM) or other static storage device coupled to bus 755 for storing static information and instructions for processor 710 or circuitry 705.

Computing component 700 may also include one or more various forms of information storage devices 720, which may include, for example, media drive 730 and storage unit interface 735. Media drive 730 may include a drive or other mechanism to support fixed or removable storage media 725. For example, a hard disk drive, a floppy disk drive, a magnetic tape drive, an optical disk drive, a CD or DVD drive (R or RW), or other removable or fixed media drive may be provided. Accordingly, removable storage media 725 may include, for example, a hard disk, a floppy disk, magnetic tape, cartridge, optical disk, a CD or DVD, or other fixed or removable medium that is read by, written to, or accessed by media drive 730. As these examples illustrate, removable storage media 725 may include a computer usable storage medium having stored therein computer software or data.

In alternative embodiments, information storage devices 720 may include other similar instrumentalities for allowing computer programs or other instructions or data to be loaded into computing component 700. Such instrumentalities may include, for example, fixed or removable storage unit 740 and storage unit interface 735. Examples of such removable storage units 740 and storage unit interfaces 735 may include a program cartridge and cartridge interface, a removable memory (for example, a flash memory or other removable memory component) and memory slot, a PCMCIA slot and card, and other fixed or removable storage units 740 and storage unit interfaces 735 that allow software and data to be transferred from removable storage unit 740 to computing component 700.

Computing component 700 may also include a communications interface 750. Communications interface 750 may be used to allow software and data to be transferred between computing component 700 and external devices. Examples of communications interface 750 include a modem or softmodem, a network interface (such as an Ethernet, network interface card, WiMedia, IEEE 702.XX, or other interface), a communications port (such as for example, a USB port, IR port, RS232 port Bluetooth® interface, or other port), or other communications interface. Software and data transferred via communications interface 750 may typically be carried on signals, which may be electronic, electromagnetic (which includes optical) or other signals capable of being exchanged by a given communications interface 750. These signals may be provided to/from communications interface 750 via channel 745. Channel 745 may carry signals and may be implemented using a wired or wireless communication medium. Some non-limiting examples of channel 745 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 715, storage unit interface 735, removable storage media 725, and channel 745. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions may enable the computing component 700 or a processor to perform features or functions of the present application as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for tracking objects in a field of view comprising:
    capturing, via a camera, a real-world object in the field of view;
    generating a first object data associating the real-world object with a first position of the real-world object in a real-world environment at a first time;
    generating a virtual object representative of the real-world object depicting the real-world object in the first position at the first time;
    generating a second object data associating the real-world object with a second position of the real-world object in the real-world environment at a second time,
    determining a displacement value of the real-world object between the first position and the second position,
    modifying the virtual object to include an indication that the real-world object has been displaced when the displacement value is greater than a threshold value.

2. The method of claim 1, further comprising:
    rendering the virtual object in an augmented reality environment; and
    displaying the virtual object on a display of an augmented reality device.

3. The method of claim 2, wherein, the augmented reality environment comprises a composite scene including the virtual object in the first position, and the real-world object in the second position, the method further comprising:
    displaying, via the display, the composite scene.

4. The method of claim 2, wherein the indication includes rendering the virtual object with a first color at the first time and rendering the virtual object with a second color different than the first color at the second time responsive to the displacement value being greater than the threshold value.

5. The method of claim 4, wherein the augmented reality environment comprises a composite scene including the virtual object and the real-world object, and wherein generating the composite scene includes overlaying the virtual object including the second color with the real-world object, wherein the virtual object and the real-world object are in the second position at the second time.

6. The method of claim 1, further comprising storing, in a non-transient storage medium, the first object data.

7. The method of claim 6, wherein determining the displacement value of the real-world object comprises retrieving the first object data from the non-transient storage medium and comparing the first object data and the second object data.

8. The method of claim 1, wherein at least one of the first object data or the second object data includes an orientation and a position of the real-world object as a function of time.

9. The method of claim 1, wherein at least one of the first object data or the second object data is configured to specify a location of the real-world object in a content.

10. The method of claim 1, wherein at least one of the first object data or the second object data is configured to specify a first character in a content.

11. The method of claim 1, wherein the real-world object comprises one or more of a second camera, a camera accessory, a person, or a prop.

12. The method of claim 1, wherein at least one of the first object data or the second object data includes an indication of a level of secrecy associated with the real-world object.

13. The method of claim 1, further comprising:
    comparing the field of view against a baseline to generate a comparison configured for use in determining a presence of a foreign real-world object that does not belong in content;
    generating a foreign object data based on the comparison;
    generating a foreign virtual object based on the foreign object data, the foreign virtual object being configured to depict the foreign object data; and
    displaying the foreign virtual object on a display of an augmented reality device.

14. The method of claim 1, wherein the first object data comprises a timecode configured to identify the first position of the real-world object as a function of time.

15. The method of claim 1, wherein at least one of the first object data or the second object data comprises an identifier configured to identify the real-world object.

16. The method of claim 1, wherein the first object data comprises a three-dimensional volume of the real-world object and the virtual object is generated to have a three-dimensional volume that matches the three-dimensional volume of the real-world object.

17. The method of claim 1, wherein the threshold value is based on a three-dimensional volume of the real-world object.

18. A system for tracking objects in a field of view comprising:
    one or more processing elements;
    one or more computer-readable non-transitory storage media encoded with instructions that when executed cause the one or more processing elements to perform operations comprising:
        capturing a real-world object in the field of view;
        generating a first object data associating the real-world object with a first position of the real-world object in a real-world environment at a first time;

generating a virtual object representative of the real-world object to depict the real-world object in the first position at the first time;

generating second object data associating the real-world object with a second position of the real-world object in the real-world environment at a second time, determining a displacement value of the real-world object between the first position and the second position, modifying the virtual object to include an indication that the real-world object has been displaced when the displacement value is greater than a threshold value.

19. The system of claim 18, wherein the operations further comprise:

rendering the virtual object in an augmented reality environment; and displaying the virtual object on a display of an augmented reality device.

20. The system of claim 19, wherein the operations further comprise:

rendering a composite scene including the virtual object in the first position, and the real-world object in the second position; and displaying, via the display, the composite scene.

* * * * *